UNITED STATES PATENT OFFICE.

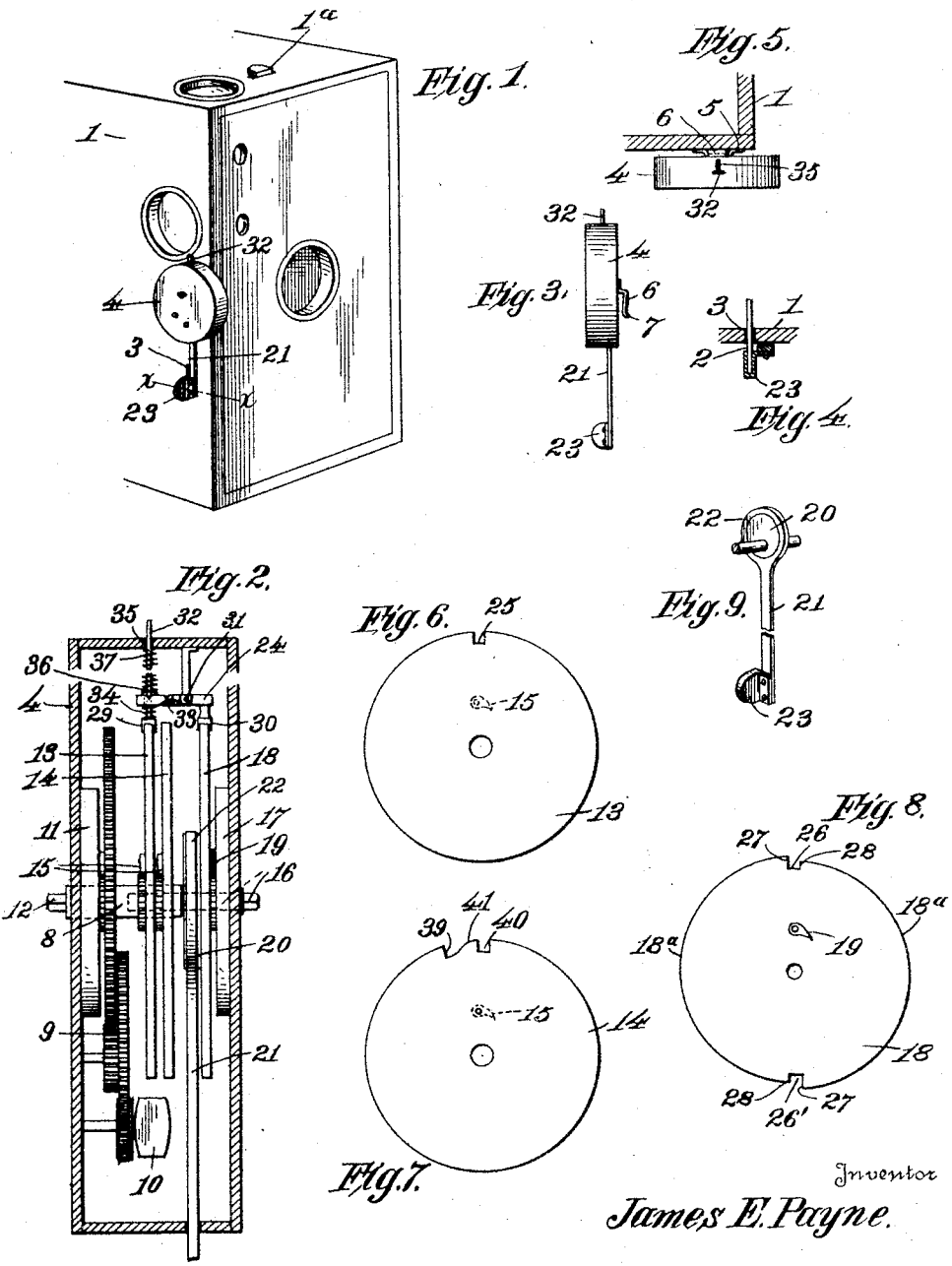

JAMES EDWARD PAYNE, OF CAMPBELL, MISSOURI, ASSIGNOR OF ONE-HALF TO MADISON N. PAYNE, OF CAMPBELL, MISSOURI.

SHUTTER-OPERATING ATTACHMENT FOR CAMERAS.

1,208,711. Specification of Letters Patent. Patented Dec. 12, 1916.

Original application filed July 16, 1915, Serial No. 40,200. Divided and this application filed November 8, 1915. Serial No. 60,354.

*To all whom it may concern:*

Be it known that I, JAMES E. PAYNE, a citizen of the United States, residing at Campbell, county of Dunklin, and State of Missouri, have invented certain new and useful Improvements in Shutter-Operating Attachments for Cameras, of which the following is a specification.

My invention relates to devices for actuating the shutter of a camera at a predetermined interval after the device is set into operation, and the present application is a continuation of my copending application Serial No. 40,200 filed July 16, 1915, as to all matter found therein.

More specifically the present invention relates to means for operating the shutter actuating lever of a box camera wherein the shutter is actuated with each movement of the lever, first in one direction and then in the other.

The object of my invention is to provide a device of the character mentioned which will operate the shutter at a given time after having been set.

A further and particular object of my invention is to provide a device as mentioned particularly adapted for use in conjunction with the box camera having a shutter operating mechanism as above mentioned so that the device will actuate the shutter lever, first in one direction and then in the other with successive operations of the device.

A further object of my invention is to provide a device of the character mentioned which may be readily applied to the box camera or kodak without the necessity of employing skilled labor.

A further object is to provide a device characterized as above mentioned, which may be detachably secured to the device so as to be readily removable when it is not desired to use the same.

Other objects will appear hereinafter.

With these objects in view my invention consists generally in a casing adapted to be secured to the camera adjacent the shutter actuating lever, a reciprocating member adapted to engage said actuating lever and means within said casing for imparting a single stroke to said reciprocating member in opposite directions upon successive operations of the device.

My invention further consists in novel means for attaching the reciprocating member to the actuating lever and in means for attaching the device to the camera box.

My invention further consists in various details of construction and arrangement of parts all as will be fully described hereinafter and particularly pointed out in the claims.

My invention will be more readily understood by reference to the accompanying drawings, forming a part of this specification and in which—

Figure 1 is a perspective view of the forward portion of a box camera equipped with a shutter operating device embodying my invention, Fig. 2 is a vertical transverse section through the casing of the device upon a much enlarged scale illustrating the mechanism in elevation, Fig. 3 is an end elevation of the device, Fig. 4 is a section on substantially the line $x$—$x$ of Fig. 1, Fig. 5 is a plan view partially in section illustrating the device attached to a camera box, Figs. 6 and 7 are detail elevations respectively of the disks driven by the timing arbor, Fig. 8 is a similar view of the disk driven by the actuating arbor, and Fig. 9 is a detail perspective view of the reciprocating shutter-lever engaging member.

Referring now to the drawings 1 indicates a box camera equipped with the usual shutter operating lever 2 which projects from the side of the box through a slot 3.

In carrying out my invention I provide a casing 4 for the actuating mechanism and equip the same with means for securing the same in position adjacent the shutter actuating lever. It is to be understood that the device is to be used as an attachment for cameras for use on certain occasions and should therefore be readily attached to and detached from the box. To this end I provide the box with a socket plate 5, as shown in Fig. 5, and equip the casing 4 with a tongue 6 adapted to engage within the socket member 5. The tongue 6 is preferably a spring member so as to frictionally engage the socket plate 5 and its end is slightly curved or flared as at 7 to facilitate engaging the members 5 and 6. It is obvious that by this construction the casing 4 may be readily attached to or detached from the box 1. Arranged within the casing 4 is an arbor 8 rotated by means of suitable clock works 9 equipped with a suitable escapement of any preferred construction, such as a butterfly wheel 10. A main spring 11 is provided for actuating the clock mechanism, and the arbor is provided with a key receiving portion 12 for winding the spring 11. Positively driven by the arbor 8 is a pair of disks 13 and 14 and to this end said disks are preferably mounted upon the arbor and equipped with ratchets 15 for operatively connecting the same thereto so that they may be driven positively in one direction only and permit of rotation of the arbor for winding the spring 11 without interfering with said disks.

A second arbor 16, hereinafter designated as the actuating arbor, is provided in the casing and equipped with a spring 17 for driving the same. This arbor actuates a disk 18 for a purpose hereinafter described, and said disk is preferably mounted upon said arbor and connected thereto by a ratchet 19 for the purpose mentioned in regard to the mounting of the disks 13 and 14. Mounted upon the arbor 16 and preferably connected to the disk 18 is an eccentric 20 upon which is mounted a reciprocating plunger 21 by means of a strap 22 encircling the eccentric. The end of the plunger 21 is provided with a socket 23 to receive the projecting end of the shutter actuating lever 2. It is obvious that by giving a half revolution to the eccentric 20 the plunger will be actuated in one direction to operate the lever 2.

As the device is intended to operate the shutter lever 2 at a predetermined time after being set for operation, means must be employed for connecting the disks of the timing arbor with the disk of the actuating arbor and to this end I provide a rock lever 24 and equip said lever and the disks with coöperating stops or engaging portions and provide means for manually operating the lever to start the device into operation.

As the general effect of the disks 13 and 14 upon the operation of the device is practically the same, except as will be hereinafter noted, I will first describe this portion of the device giving reference alone to the disk 13 for the purpose of simplifying the description. The periphery of the disk 13 is preferably circular and a notch 25 is provided in its periphery. The disk 18 on the arbor 16 is provided with a pair of similar notches 26 and 26' in its periphery, the periphery of the disk increasing in distance from the center from one notch to the other thereby forming shoulders 27 and 28 with the former at a greater distance from the center of rotation than the latter. The rock lever 24 is equipped with blocks or detents 29 and 30 arranged at opposite ends thereof and adapted to engage in the notches 25 and 26—26' respectively of the disks 13 and 18.

The lever 24 being pivotally mounted in the casing as at 31, it is obvious that with both of said detents arranged within their respective notches that the arbors 8 and 16 are held against rotation. The detent 30 is preferably rigidly connected to the lever 24 whereas the detent 29 is mounted for transverse reciprocation thereon and to this end it is preferably formed upon a stem 32 extending through an aperture 33 in said lever, and a spring 34 is interposed between said detent and the lever as clearly shown in Fig. 2. The stem 32 projects through an aperture 35 in the casing and is provided with a collar 36 resting upon the opposite side of the said lever from the detent 29. A spring 37 is interposed between the collar 36 and the casing 3 for holding the detent in engagement with the disk 13. It is obvious that by grasping the end of the stem 32 and drawing the same upwardly against the tension of the spring 37 the detent 29 will be drawn from the notch 25 thereby permitting the clock work driven arbor 8 to begin to rotate. It is also obvious that at this time, the detent 30 will be held in its respective notch through the resiliency of the spring 34. As soon as the disk 13 has made one complete revolution, which due to the clock mechanism, is sufficient for the purpose intended, the detent 29 snaps into the notch 25 and, because of the momentum of the parts, through the action of the springs, rocks the lever sufficiently to withdraw the detent 30 to a position slightly above the shoulder 28 as shown in Fig. 8 thereby releasing the disk 18 which is driven by the arbor 16. The disk 18 and arbor 16 together with the eccentric 20 then rotate, and upon rotation imparts the aforesaid movement to the plunger 21, thereby operating the shutter of the camera. Upon rotation of the disk 18 the cam periphery 18$^a$ thereof will gradually force the detent 30 upwardly, compressing the spring 34 until said detent shall pass over the shoulder 27 at which time the spring 37 reacts with sufficient force to drive the detent into the notch 26 below the shoulder 28 thereby stopping the operation of the device after having actuated the shutter.

The above description applies to the device when used for instantaneous exposures. By instantaneous in this connection I mean such fractional exposures as are obtained by setting the ordinary shutter timing device to operate the shutter through a given fraction of a second with a single impulse to the operating mechanism. When it is desired to give a greater length of time than that provided by the said mechanism I provide the disk 14. This is formed in its periphery with a pair of spaced notches 39 and 40 connected by an incline or cam 41 forming one wall of the notch 39. The detent 29 normally rests within the notch 40 and after the disk has made a partial revolution, said detent drops into the notch 39 thereby giving one impulse to the member 21 to open the shutter. The detent 29 then travels up the cam edge 41 and drops into the notch 40 giving the second impulse to the member 21 to close the shutter. The time the shutter is open is therefore governed by the space between the notches 39 and 40 and the speed with which the disk 14 is driven by the clock work.

1ª indicates the slide on the camera which is provided in devices of this character to change the timing of the shutter from an instantaneous exposure to a time exposure, that is, when the slide is in the position shown, a single impulse to the lever 2 in either direction will actuate the shutter for a complete exposure, but by drawing out the slide the shutter mechanism will be actuated so that one impulse to the lever will open the shutter and a reverse impulse will close the same. It is obvious therefore that the slide 1ª coöperates with the mechanism when the disk 14 is employed for giving a time exposure.

In practice I prefer to equip each device with the two disks 13 and 14 so that either may be used as preferred or found necessary according to the conditions presenting themselves at the time the picture is taken. It is therefore necessary to provide means whereby the detent 29 may be shifted to coöperate with either of the said disks as required. To this end said disks are arranged in proximity to each other as shown in Fig. 8 and the apertures 33 in the lever 24 is in the form of an elongated slot of sufficient length to permit shifting of the stem 32 with the detent from engagement with the periphery of one disk to that of the other. By arranging the disks in close proximity the detent is caused to engage in the notch of one disk before it is disengaged from the other disk thereby preventing operation of the device when shifting from one disk to the other. In order that the operator may be advised when the detent is in proper position I provide the lever 24 with notches 42 and equip the collar 36 with a detent 43 to engage therein. The springs 34 and 37 will maintain said detent in the notches except when manually operated.

I claim:

1. A device of the class described comprising a casing adapted to be secured to a camera box adjacent the shutter operating lever, means for engaging said lever and a time operated device for imparting an impulse to said lever engaging means, first in one direction and then in the other upon successive operations of the device, substantially as described.

2. A camera box in combination with a casing detachably secured thereto adjacent the shutter operating lever, means for detachably engaging said lever, and a time operated device for imparting an impulse to said lever engaging means, first in one direction and then in the other upon successive operations of the device, substantially as described.

3. A box camera having the usual shutter operating lever projecting therefrom in combination with a casing supported by said box, a reciprocating member, a socket on the end of said member to receive the end of said lever and time operated mechanism within said casing for imparting an impulse to said reciprocating member, first in one direction and then in the other upon successive operations of the device, substantially as described.

4. A camera box of the kodak type provided with the usual lever for normally completely actuating the shutter upon each movement thereof and a slide for transforming the shutter mechanism for a time exposure in combination with a reciprocating member engaging the shutter actuating lever, time actuated mechanism for normally imparting a single impulse to said reciprocating member, and means for modifying the action of said time controlled means to impart an impulse to said reciprocating member, first in one direction and then in another upon each operation of the device, substantially as described.

5. In a device of the class described, a clock work driven timing disk provided with a notch in its periphery, a spring driven actuating disk provided with diametrically opposite notches in its periphery, the radius of the disk being increased from each notch to the next notch in the same direction, a rock lever, a detent upon each end of said lever, one of said detents being adapted to engage within the notch of the timing disk and the other within the notches of the actuating disk, means for manually withdrawing the detent from engagement with the notch in the timing disk and means connected to the actuating disk for operating the shutter actuating mechanism of a camera, substantially as described.

In testimony whereof I have signed my name to this specification in the presence of two subscribing witnesses.

JAMES EDWARD PAYNE.

Witnesses:
  HOWARD S. AUSTIN,
  F. M. GRAHAM.

Copies of this patent may be obtained for five cents each, by addressing the "Commissioner of Patents, Washington, D. C."